US010203742B2

(12) United States Patent
Sizikov et al.

(10) Patent No.: US 10,203,742 B2
(45) Date of Patent: *Feb. 12, 2019

(54) EFFICIENT INTEGRATED SWITCHING VOLTAGE REGULATOR COMPRISING SWITCHES COUPLED TO BRIDGE DRIVERS TO PROVIDE REGULATED POWER SUPPLY TO POWER DOMAINS

(71) Applicant: Intel Corporation, Santa Clara, CA (US)

(72) Inventors: Gregory Sizikov, Haifa (IL); Michael Zelikson, Haifa (IL); Efraim Rotem, Haifa (IL); Eyal Fayneh, Givatyim (IL)

(73) Assignee: INTEL CORPORATION, Santa Clara, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/290,619

(22) Filed: Oct. 11, 2016

(65) Prior Publication Data

US 2017/0031419 A1    Feb. 2, 2017

Related U.S. Application Data

(63) Continuation of application No. 14/634,481, filed on Feb. 27, 2015, now Pat. No. 9,477,291, which is a
(Continued)

(51) Int. Cl.
*G06F 1/00* (2006.01)
*G06F 1/26* (2006.01)
(Continued)

(52) U.S. Cl.
CPC ............... *G06F 1/324* (2013.01); *G05F 3/08* (2013.01); *G06F 1/26* (2013.01); *G06F 1/32* (2013.01); *G06F 1/3275* (2013.01); *H02M 3/158* (2013.01)

(58) Field of Classification Search
CPC .................................................... G06F 1/3203
(Continued)

(56) References Cited

U.S. PATENT DOCUMENTS 5,408,150 A * 4/1995 Wilcox ............... H02M 1/38
326/104
6,008,611 A   12/1999 Chen et al.
(Continued)

FOREIGN PATENT DOCUMENTS

| JP | 2011181757 | 9/2011 |
|---|---|---|
| KR | 1020060050186 | 5/2006 |
| KR | 1020100090513 | 8/2010 |

OTHER PUBLICATIONS

Notice of Allowance for Taiwain Patent Application No. 102120109, dated Sep. 17, 2015, (with English translation), 3 pages.
(Continued)

*Primary Examiner* — Suresh Suryawanshi
(74) *Attorney, Agent, or Firm* — Womble Bond Dickinson (US) LLP

(57) ABSTRACT

Described herein is an integrated circuit which comprises: a switching voltage regulator (SVR), having one or more bridge drivers, to provide regulated power supply to a plurality of power domains; and a power control unit (PCU) operable to adjust switching frequencies of the SVR according to states of the plurality of power domains, wherein drive strength or active phase count of the one or more bridge drivers is also adjusted by a logic unit of the SVR when the switching frequencies of the SVR are adjusted.

20 Claims, 7 Drawing Sheets

Related U.S. Application Data continuation of application No. 13/538,262, filed on Jun. 29, 2012, now Pat. No. 9,003,209.

(51) Int. Cl.
*G06F 1/32* (2006.01)
*G05F 3/08* (2006.01)
*H02M 3/158* (2006.01)

(58) Field of Classification Search
USPC .......................................................... 713/300
See application file for complete search history.

(56) References Cited

U.S. PATENT DOCUMENTS

| | | | |
|---|---|---|---|
| 6,064,187 A * | 5/2000 | Redl | G05F 1/565 |
| | | | 323/224 |
| 6,965,223 B1 | 11/2005 | MacLean et al. | |
| 7,154,320 B2 | 12/2006 | Mughal et al. | |
| 7,373,540 B2 | 5/2008 | Kim | |
| 7,383,456 B2 | 6/2008 | Ono | |
| 7,592,789 B2 | 9/2009 | Jain | |
| 7,948,720 B2 * | 5/2011 | Mok | H02M 3/156 |
| | | | 323/272 |
| 8,037,326 B2 | 10/2011 | Burton et al. | |
| 8,181,041 B2 * | 5/2012 | Kung | G06F 1/32 |
| | | | 323/272 |
| 8,203,359 B2 | 6/2012 | Dequina et al. | |
| 8,294,445 B2 | 10/2012 | Kwok | |
| 8,347,130 B2 | 1/2013 | Park | |
| 8,963,519 B2 | 2/2015 | Zambetti et al. | |
| 8,994,346 B2 | 3/2015 | Rahardjo et al. | |
| 2006/0156045 A1 | 7/2006 | Galles | |
| 2011/0316502 A1 | 12/2011 | Tang et al. | |
| 2012/0079290 A1 | 3/2012 | Kumar et al. | |
| 2014/0002049 A1 | 1/2014 | Schrom et al. | |

OTHER PUBLICATIONS

Allowed claims in Taiwan Patent Application No. 102120109, mailed Sep. 17, 2015, (with English translation), 46 pages.
International Search Report and Written Opinion of the International Searching Authority issued for International Application No. PCT/US2013/044073, dated Aug. 27, 2013, 11 pages.
First Rectification Notification issued for Chinese Patent Application No. 201320379106.8, dated Oct. 14, 2013, 5 pages.
Office Action with English Translation from Foreign Counterpart Chinese Patent Application No. 201320379106.8, dated Apr. 15, 2014, 4 pages.
Notification Concerning Transmittal of International Preliminary Report on Patentability (Chapter 1 of the Patent Cooperation treaty), dated Jan. 8, 2015, 8 pages.
Taiwan (R.O.C.) Patent Application No. 102120109, Official Communication and Search Report dated Jan. 15, 2015, 8 pages, (only English translation of the Search Report).

* cited by examiner

| P-State | C-State | Switching Frequency Setting |
|---|---|---|
| P0 | C0 | A GHz |
| P1 | C0 or C1 | B GHz |
| P2 | C0 or C2 | C GHz |

EFFICIENT INTEGRATED SWITCHING VOLTAGE REGULATOR COMPRISING SWITCHES COUPLED TO BRIDGE DRIVERS TO PROVIDE REGULATED POWER SUPPLY TO POWER DOMAINS

CROSS REFERENCE TO RELATED APPLICATIONS

The present application is a continuation application of U.S. patent application Ser. No. 14/634,481, filed on Feb. 27, 2015, which is a continuation application of U.S. patent application Ser. No. 13/538,262 filed on Jun. 29, 2012, now issued as U.S. Pat. No. 9,003,209, and claims the priority benefit thereof. These applications are incorporated herein by reference in their entirety.

BACKGROUND

Systems of chip (SOCs) are sensitive to idle power and battery life. Such SOCs have integrated circuits that operate on multiple power domains and have a wide range of power operations. Voltage regulators may provide power supplies to the multiple power domains. However, typical voltage regulators lack the efficiency to provide power supplies for wide range of power operations and multiple power domains in an integrated chip.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 3 is a lookup table with switching frequency settings for the SVR for various P-states and C-states, according to one embodiment of the disclosure.

DETAILED DESCRIPTION

Figure 1:
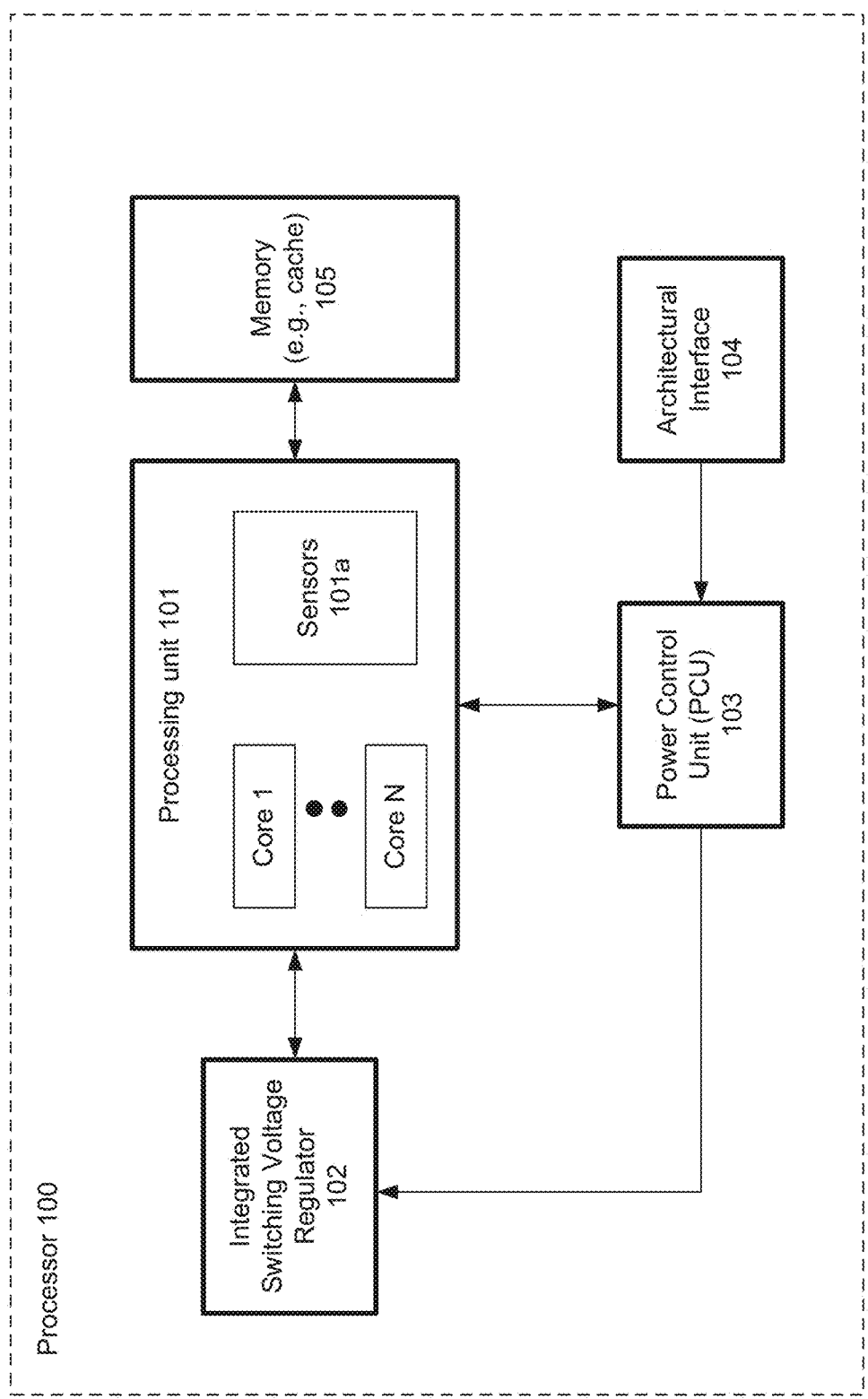
FIG. 1 is a processor with an integrated switching voltage regulator (SVR), according to one embodiment of the disclosure.

Typical voltage regulators may optimize their efficiency by adjusting their bridge driver strengths and/or by adjusting a number of active phases driven by the bridge drivers of the voltage regulators. However, optimization of such voltage regulators is inefficient because the switching frequency of the voltage regulator remains static i.e., constant switching frequency is assumed for all power domains being provided with regulated supplies from the voltage regulator.

The term "power domain" herein generally refers to logic areas in an integrated circuit (IC) chip that receive a specific power supply. Different logic areas in the IC chip may operate on different power supplies. Such logic areas are referred to as power domains. For example, the input-output (I/Os) of the IC chip may operate at a different power supply than the processing core of the IC chip, where the I/O and the processing core form two different power domains.

The voltage regulator discussed herein is an integrated switching voltage regulator (SVR) which is optimized to operate for various power domains by adjusting the effective bridge driver strength and the switching frequency of the SVR. The term "SVR" herein refers to positioning the voltage regulator inside the IC on the same die as the IC. The embodiments discussed herein may also be used in voltage regulators positioned in the same package as the processor die.

In one embodiment, the bridge driver strength and the switching frequency of the SVR is adjusted when P-state and/or C-state, associated with the power domain or the IC chip, is modified. By dynamically adjusting both the bridge driver strength and the switching frequency, greater efficiency for the SVR is materialized. In one embodiment, components of the chip can access the lookup table for adjusting switching frequencies via software and/or hardware. In one embodiment, both the bridge driver strength and the switching frequency are adjusted for each power domain of the chip.

In the embodiments discussed herein, bridge drivers are integrated MOSFETs that implement the switches of the SVR. In one embodiment, the bridge driver receives a modulated input signal, for example, a pulse width modulated (PWM) signal, and drives a bridge to generate a regulated power supply for a load (e.g., a processor core, or power domain). In one embodiment, the output of the bridge drive an inductor having a first end coupled to the bridge and a second end coupled to a load capacitor. The other end of the inductor coupled to the load capacitor provides the regulated supply to the power domain. In one embodiment, the bridge driver comprises multiple similar schematic and layout blocks. The term "blocks" herein generally refer to PMOS or NNOS devices that can be independently turned on or off to change the drive strength of the bridge driver. In one embodiment, the drive strength of the bridge driver is adjusted by the number of the blocks that are enabled. In one embodiment, when all of the blocks of the bridge driver are enabled the driver is at its maximal drive strength. In one embodiment, disabling of a bridge driver is implemented by not supplying the switching signals to the blocks that are disabled.

The term "efficiency" herein generally refers to operating the SVR with a switching frequency and/or bridge driver strength such that the SVR exhibits minimum or substantially close to minimum voltage regulator power losses. The term "increasing efficiency" of the SVR i.e., operating the SVR with minimum or substantially close to minimum voltage regulator power losses, is interchangeably referred to mean "optimizing the SVR." The terms "substantially," "close," "approximately," herein refer to being within +/−20% of a target value.

The term "C-state" generally refers to a power management state of the chip or processor as defined by the Advance Configuration and Power Interface (ACPI) Specification as published in Nov. 23, 2011 as Revision 5.0. For example, a microprocessor (CPU) power states C0-C3 are defined as follows: C0 being the operating state; C1 (often known as Halt) being a state where the CPU is not executing instructions, but can return to an executing state essentially instantaneously; Enhanced C1 state (C1E or Enhanced Halt State) being a CPU state for lower power consumption; C2 (often known as Stop-Clock) being a state where the CPU maintains all software-visible state, but may take longer to wake up; and C3 (often known as Sleep) being a state where the processor does not need to keep its cache coherent, but maintains another state. Some CPUs have variations on the C3 state (Deep Sleep, Deeper Sleep, etc.) that differ in how long it takes to wake the processor. The above list of C-states is not comprehensive. Other power management states may be integrated to optimize SVR as discussed in the embodiments herein.

The term "P-state" generally refers to voltage and frequency management state of the chip or processor as defined by the Advance Configuration and Power Interface (ACPI) Specification as published in Nov. 23, 2011 as Revision 5.0. For example, a processor may have P0-Px states, where 'x' is an integer.

While the embodiments herein use P-states and C-states as defined by the ACPI, in some embodiments other power management states associated with other specifications may be used for adjusting switching frequency and/or bridge driver strength to optimize the SVR.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected, or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on."

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments described herein, the transistors are metal oxide semiconductor (MOS) transistors, which include drain, source, gate, and bulk terminals. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The terms "MN" herein indicates an n-type transistor (e.g., NMOS, NPN BJT, etc) and the term "MP" indicates a p-type transistor (e.g., PMOS, PNP BJT, etc).

FIG. 1 is a processor 100 with a SVR, according to one embodiment of the disclosure. In one embodiment, the processor 100 comprises processing unit 101, SVR 102, a power control unit (PCU) 103, architectural interface 104, and a memory unit 105. In one embodiment, the processor 100 comprises a graphics unit (not shown).

In one embodiment, the processing unit 101 comprises one or more processing cores—cores 1-N, where 'N' is an integer. In one embodiment, each processing core comprises logic units to execute machine executable instructions. For example, the processing core comprises an arithmetic logic unit (ALU), register file (RF), etc. In one embodiment, each processing core forms a power domain.

In one embodiment, the memory unit 105 comprises one or more caches coupled to the processing cores. In one embodiment, the memory unit 105 includes a lookup table to store switching frequencies for various P-states and C-states associated with the processor 100. In one embodiment, the contents of the table are formed by identifying switching frequencies for various P-states and C-states that result in minimum SVR power losses i.e., with optimized SVR.

In one embodiment, the processing unit 101 comprises sensors 101a coupled to the processing cores or embedded in the processing cores. In one embodiment, the sensors 101a include temperature sensor(s), frequency sensor(s), power sensor(s), etc.

In one embodiment, the PCU 103 is coupled to the processing unit 101 and the SVR 102 and controls the power management of the processor 100. For example, the PCU 103 may monitor the sensors 101a to determine the current operating frequency, temperature, and/or power consumption of the processing unit 101 and optimize the power consumption of the processor 100 by instructing the processor 100 to adjust its operating frequency and power supply levels.

In one embodiment, the PCU 103 determines the architectural state (e.g., P-State and/or C-state) of the processor 100 via the architectural interface 104. In such an embodiment, the PCU 103 instructs the SVR 102 to adjust its switching frequency and/or bridge driver strength according to the current architectural state of the processor 100. For example, the processor 100 may transition from C0 power state to C1 power state. In such an embodiment, the PCU 103 accesses the lookup table (not shown) from the memory 105 or from a memory inside the PCU 103 and determines a switching frequency for operating the SVR 102. The SVR 102 then selects the appropriate switching frequency as informed by the PCU 103. In this embodiment, the bridge driver strength is also adjusted to reduce (e.g., minimize or optimize) SVR power losses.

In one embodiment, the SVR 102 comprises a voltage regulator (VR) controller, a bridge driver, a bridge, an inductor, and capacitor. In one embodiment, the VR controller comprises one or more signal generators. In one embodiment, the signal generators are pulse width modulation (PWM) generators generating one or more signals with an adjustable duty cycle. These signals are then used to generate regulated power supplies for power domains of the processor 100. In other embodiments, other controllers with different signal generators may be used. For example, a PFM (pulse frequency modulation) controller, a hysteretic controller, or a current-mode controller may be used in conjunction or instead of the PWM signal generator based controller.

In one embodiment, the VR controller comprises one or more bridge controllers. In one embodiment, the one or more bridge controllers generate control signals to drive various components/devices of the bridge driver. Control signals include, for example, signals indicating when to turn on or off the bridge drivers. In one embodiment, one end of the inductor is coupled to the output of the bridge driver while the other end of the inductor is coupled to the capacitor which provides the regulated power supply to the power domain.

In one embodiment, the VR controller comprises a phase controller which adjusts the duty cycle of the signals generated by a switch matrix of the PWM generators. The term "duty cycle" herein refers to the ratio of high phase over low phase of a periodic signal. For example, a 50% duty cycle signal has a ratio of 1:1 of high phase to low phase. A 25% duty cycle signal has a high phase which is four times larger (in time domain) than its low phase.

The switch matrix (discussed later with reference to FIG. 4 and FIG. 7) is organized in rows and columns of switching transistors controlled by the signals from the phase controller. In one embodiment, the phase controller is operable to select periodic delay signals from a delay line to control the phases of the signal generators to adjust the duty cycle of the signal generated by a comparator coupled to the switch matrix and/or for turning on or off phases of the signal generators.

In one embodiment, the periodic delay signals are generated by a digital phase generator. In one embodiment, the slopes of these periodic delay signals are shaped according to the frequencies of the delay signals. By adjusting the slopes of these periodic delay signals, the losses of the SVR are also adjusted.

In one embodiment, the one or more bridge drivers, coupled to the PWM generators, are operable to receive control signals from corresponding bridge controllers to generate signals for driving the bridge (not shown). In one embodiment, the bridge comprises one or more bridges the output of which drive the inductor to generate a regulated power supply for the processing unit 101. Some components of the SVR 102 are also discussed with reference to FIGS. 4-7.

Figure 2:
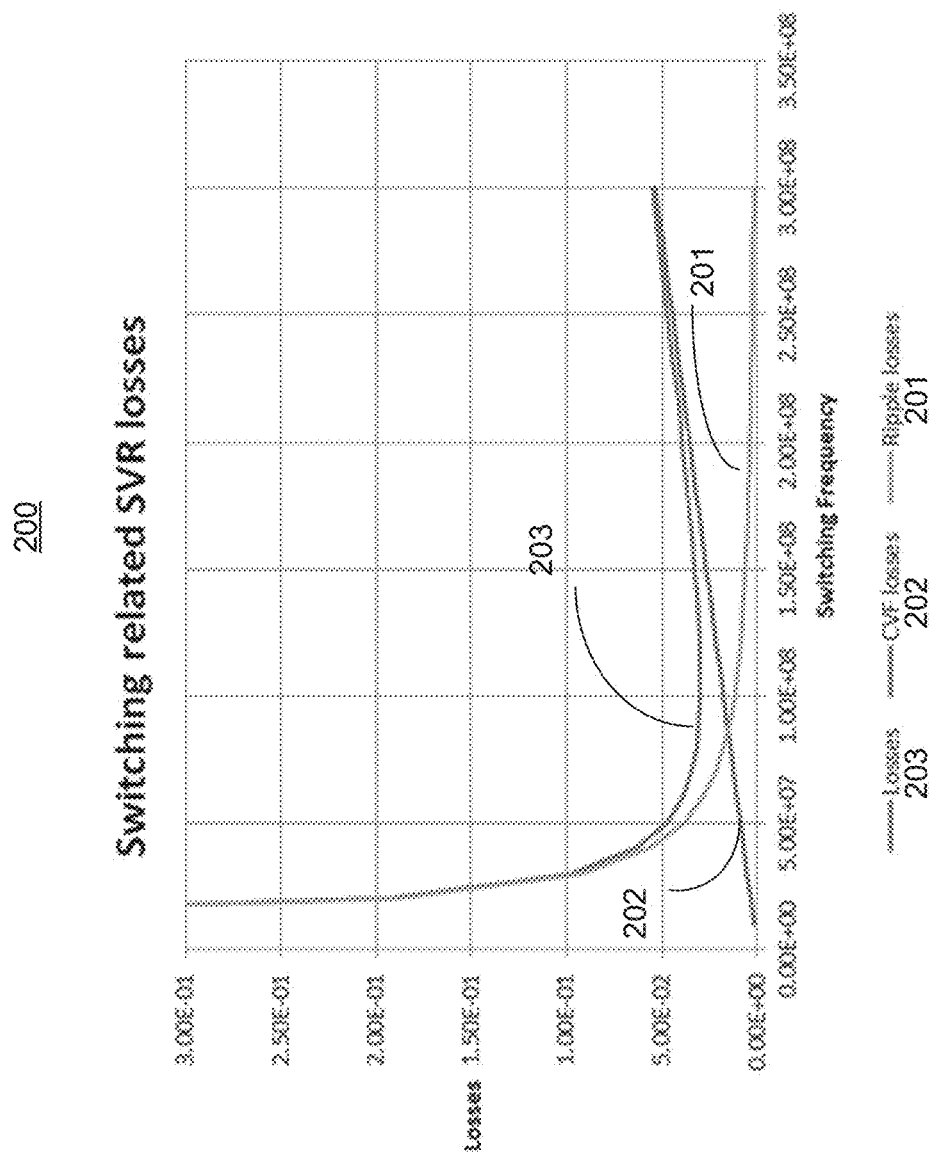
FIG. 2 is an exemplary waveform for identifying switching frequency for the SVR with respect to SVR losses, according to one embodiment of the disclosure.

FIG. 2 is an exemplary waveform 200 for identifying switching frequency for the SVR 102 with respect to SVR losses, according to one embodiment of the disclosure. The x-axis is the switching frequency and the y-axis is the corresponding power losses. In this example, the three curves indicate different kinds of SVR losses. The waveform 200 is not directly load dependent. It shows switching frequency dependent losses. The three curves in 200 are a function of the SVR configuration which in turn is a function of the load. In one embodiment, identifying switching frequency for the SVR 102 is an iterative process. For example, reasonable switching frequency (e.g., a switching frequency that causes the SVR to operate functionally) is assumed and the SVR switching frequency is then optimized for minimum SVR losses. In one embodiment, a single iteration is enough to reduce (e.g., minimize or optimize) SVR losses for a switching frequency. In other embodiments, multiple iterations are performed to determine the switching frequency that may result in minimum SVR losses.

In this example, curve 201 indicates ripple losses at the output of the SVR 102. As switching frequency increases, the ripple losses reduce. However, higher switching frequency may result in higher power dissipation. Curve 202 indicates CVF losses, where "CVF" stand for capacitance multiplied by voltage multiplied by frequency. "CVF" is the dynamic current in MOS based circuits. In this example, the CVF losses increase with increasing switching frequencies. Curve 203 indicates overall SVR losses.

In one embodiment, a switching frequency close to the minimum point of the curve 203 is selected and recorded in the lookup table accessible by the PCU 103. In one embodiment, switching frequencies that result in close to minimum SVR losses for different P-state and C-state SVR loading conditions is determined and recorded/programmed in the lookup table. The loading conditions refer to the load driven by the SVR 102. For example, different power domains offer different loading conditions and different SVR structure in terms of capacitors/inductors/phases configuration at different P-states and C-states.

In one embodiment, a similar process is used to determine optimum bridge driver strengths for various P-state and C-state SVR loading conditions using a similar waveform plot. In one embodiment, the optimum bridge driver strengths for various P-state and C-state SVR loading conditions are recorded/programmed in the lookup table.

FIG. 3 is a lookup table 300 with switching frequency settings for the SVR 102 for various P-states and C-states, according to one embodiment of the disclosure. In this exemplary embodiment, three P-states (P0-P2) and three C-state (C0-C2) and their corresponding switching frequencies are tabulated. In other embodiments, other power management states and/or fewer or more power management states and their corresponding switching frequencies may be stored/programmed in the lookup table 300. In one embodiment, the lookup table 300 is stored in the memory 105. In other embodiments, the lookup table 300 is stored in the PCU 103.

Figure 4:
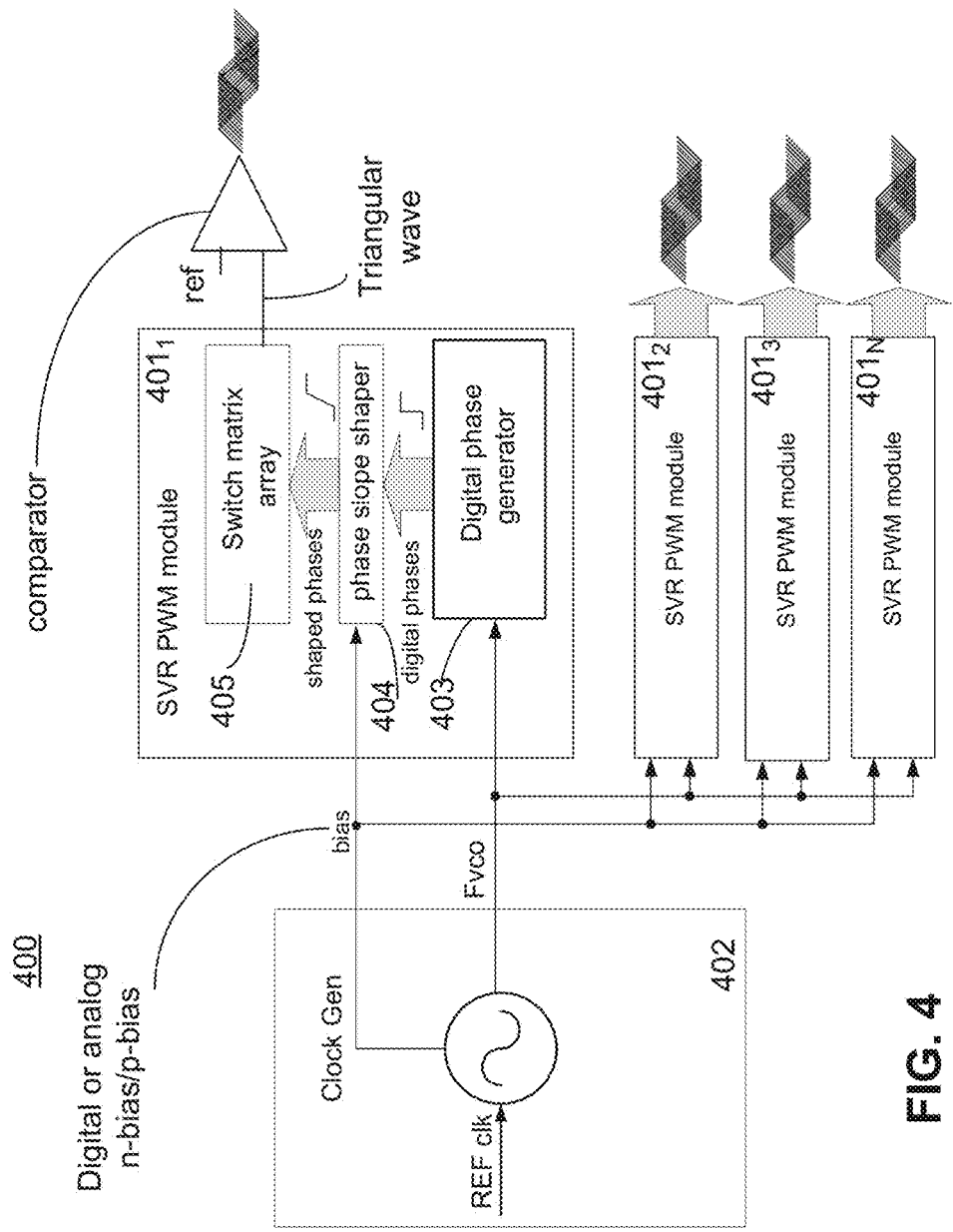
FIG. 4 is a high level architecture of the SVR clocking scheme, according to one embodiment of the disclosure.

FIG. 4 is a high level architecture 400 of the SVR clocking scheme for adjusting the switching frequency, according to one embodiment of the disclosure. In one embodiment, the SVR 102 comprises one or more signal generation modules 401$_{1-N}$, where 'N' is an integer, and a clock generation module 402.

In one embodiment, each of the one or more signal generation modules 401$_{1-N}$ comprises digital phase generator 403, phase slope shaper 404, and a switch matrix array 405. In one embodiment, each power domain is associated with its own SVR comprising its own PWM, bridge drivers, inductors, and output capacitors. In other embodiments, multiple power domains may have a single SVR comprising its own PWM, bridge drivers, inductors, and output capacitors. In one embodiment, the processor has multiple processing cores with each processing core having its own power domain.

In one embodiment, each phase for each power domain has its own comparator. In one embodiment, the comparator compares the compensator output with a triangular waveform at the switching frequency to produce a PWM signal. In one embodiment, the clock generation block 402 is centralized and shared between all SVR power domains.

In one embodiment, the digital phase generator 403 generates digital phases with the frequency of the SVR. In one embodiment, the digital phases compose the triangle wave (used for the comparator input) after being shaped by the slope shaper 404. In one embodiment, the slope shaper 404 determines the slope of the signal that is driving the switch matrix 405. In one embodiment, the slope is adjusted so that it is substantially equal to the distance between the digital phases. In one embodiment, the switch matrix array 405 generates a triangular wave by interpolating its input phases.

So as not to obscure the embodiments of the disclosure, signal generation modules 401₁ (also referred to as 401) is discussed. The same discussion is applicable to other signal generation modules 401₂₋N. In one embodiment, the digital phase generator 403 is operable to receive a periodic signal from the clock generation module 402 and divides that signal to generate a plurality of phases for controlling the switch matrix array 405.

In one embodiment, the digital phase generator 403 comprises one or more signal dividers. In one embodiment, the digital phase generator 403 comprises a divide-by-16 circuit to divide Fvco (frequency output clock) signal by 16 to generate 16 digital phases from one period of Fvco. In one embodiment, the digital phase generator 403 comprises a divide-by-32 circuit to divide Fvco signal by 32 to generate 32 digital phases from one period of Fvco. In other embodiments, a combination of divide-by-8, divide-by-16, and divide-by-32 dividers are included in the digital phase generator 403 to generate multiple phases to change the switching frequency of the SVR 102 according to changes to P-States or C-states. In one embodiment, fewer or more divide-by circuits are used to provide fewer or additional selection of digital phases for finer granularity of switching frequency adjustment.

In one embodiment, the periodic signal from the clock generation module 402 is an output of a voltage controlled oscillator (VCO) or a digitally controlled oscillator (DCO), or an LC oscillator. Any clock generation circuit may be used for the clock generation module 402. For example, a phase locked loop (PLL) may be used as the clock generation module 402 which is operable to receive a reference clock (REF clk) and generate a high frequency output clock Fvco which is phase aligned with the REF clk. In one embodiment, the PLL is a self-biased PLL (SBPLL).

In one embodiment, the SVR clock generator 402 is based on a PLL that generates a high frequency SSC (spread spectrum clock) clock signal Fvco. In one embodiment, Fvco is then divided by the digital phase generator 403 into slower frequency signals and thus different number of phases. In one embodiment, the digital phase generator 403 is implemented as a ring-counter (not shown). In one embodiment, the ring-counter outputs are shaped by the phase slope shaper 404 and used as control signals for the switch matrix array 405 that builds the triangle waves i.e., SVR clock phases. In one embodiment, the frequency of the control signals is substantially equal to the frequency of the SVR clock Fvco. In one embodiment, the digital phase generator 403 can be configured to one or more division modes to generate different SVR frequencies from the same PLL frequency.

In one embodiment, different power domains are optimized with different switching frequency to reduce overall losses in the FIVR 102. In one embodiment, the clock signal phases are generated by the digital phase generator 403, shaped by the phase slope shaper 404 and provided to the switch matrix array 405 via a phase selector.

In one embodiment, the phase slope shaper 404 receives bias signals from the SBPLL (clock generation unit 402) which are used to adjust the slope of the signals from the digital phase generator 403 according to the frequency of the Fvco signal. For example, when the frequency of the Fvco increases, the slope of the output signals from the phase slope shaper is made faster (i.e., slope increases). When the frequency of the Fvco decreases, the slope of the output signals from the phase slope shaper is made slower (i.e., slope decreases). In one embodiment, the bias signals are substantially the same (voltage and/or current levels) to the bias signals used for operating a voltage controlled oscillator (VCO) of the PLL. In one embodiment, the PLL is a SBPLL. In other embodiments, other PLL architectures may be used. For example, LC Oscillator based PLL, digital PLL, etc.

In one embodiment, the slope shaper stage circuit of the phase slope shaper 404 converts a digital input slope to a shaped output slope equal to T_slope which is approximately equal to TFvco/2, where T_slope is the slope in time domain (e.g., 20 picoseconds), while TFvco is the period of a Fvco signal. In one embodiment, the output slope is determined by the slope shaper stage current and output load. In one embodiment, the slope shaper stage current is determined by trimming n-type and p-type current sources. In one embodiment, the trimming of the n-type and p-type current sources is used to compensate the slope shaper stage current vs. process corner.

In one embodiment, the switch matrix array 405 is designed according to the maximum number of clock phases generated by the digital phase generator 403. In one embodiment, the switch matrix array 405 comprises transistors with gates controlled by the output of the phase slope shaper 404, where the transistors are coupled to high and low voltage rails, VH and VL respectively, to generate an intermediate voltage level signal to drive a bridge driver (after being compared with a reference signal via a comparator.

In one embodiment, a triangle wave is generated by the switch matrix array 405. The triangle wave is then compared via the comparator with a reference signal to generate a PWM signal for driving the bridge driver. In one embodiment, the transistors in the switch matrix 405 are coupled to input rails, VH (high) and VL (low). In one embodiment, the triangle wave amplitude corresponds to a difference between VH and VL. In one embodiment, when a control signal from the phase slope shaper 404 is toggled high, a transistor in the switch matrix array 405 coupled to VH is closed and a transistor in the switch matrix array 405 coupled to VL is open. In such an embodiment, the operation leads to a voltage step towards VH. In one embodiment, to smooth the voltage step to a linear voltage wave, the switch matrix control signals are shaped by the phase slope shaper 405.

This operation causes the switches to open and close in a linear manner. To improve (e.g., maximize) the linearity, the control signal slope timing is shaped to be equal to the time distance between two adjacent control signals. In one embodiment, this time interval is equal to half of the Fvco cycle time which is also equal to 1 over the Fvco frequency divided by 2× of the digital phase generator division ratio. In one embodiment, to support a wide range of SVR frequencies, the output of the phase slope shaper 404 tracks the PLL frequency Fvco by using the same bias signals as the PLL. One such embodiment is illustrated in FIG. 5 and FIG. 6.

Referring back to FIG. 4, in one embodiment, the control signals generated by the phase slope shaper 404 causes the switches of the switch matrix array 405 to open and close in a linear manner. In one embodiment, to improve (e.g., maximize) the linearity, the control signal slope timing is shaped to be substantially equal to the time distance between two adjacent control signals. In one embodiment, this time interval is substantially equal to half of the Fvco cycle time.

Figure 5:
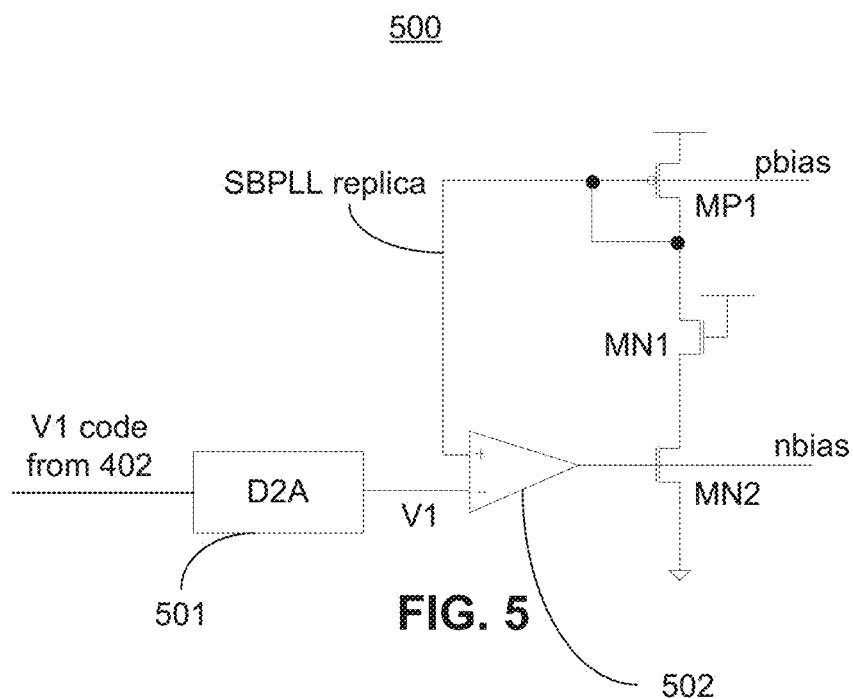
FIG. 5 is a circuit for providing bias voltages to a phase slope shaper of the SVR, according to one embodiment of the disclosure.
Figure 6:
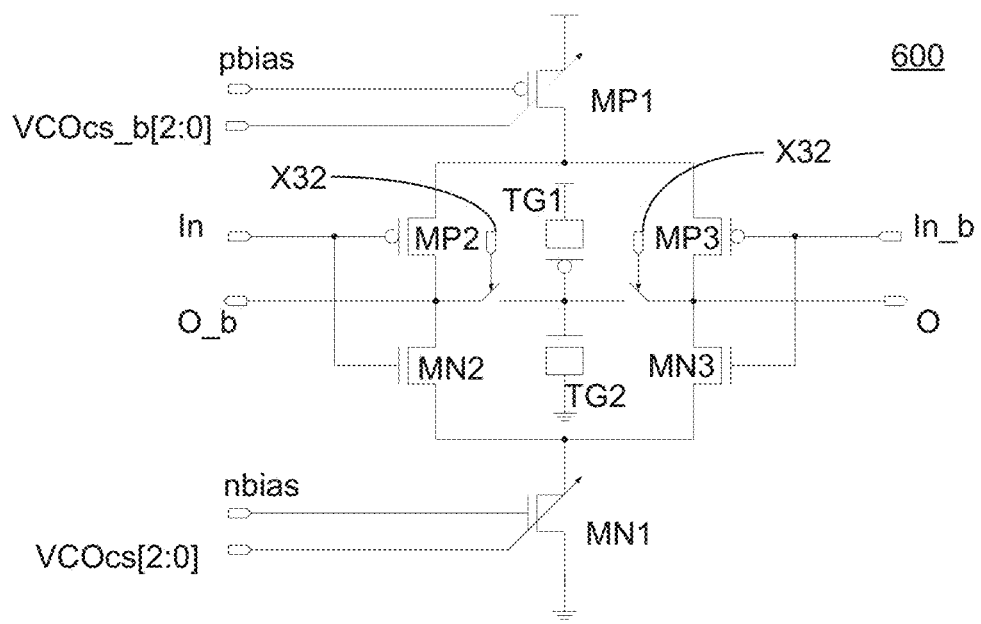
FIG. 6 is a phase slope shaper of the SVR, according to one embodiment of the disclosure.

FIG. 5 is a circuit 500 for providing bias voltages to the phase slope shaper 404 of the SVR $401_1$/102, according to one embodiment of the disclosure. In one embodiment, analog bias voltages that provide bias levels for the oscillator of the SBPLL (self biased phase locked loop) are not directly routed to the circuit 500 because of noise consideration on analog signals. In one embodiment, the analog bias voltages from the clock generation module 402 are converted into digital form via an analog-to-digital (A2D) converter (not shown) and then routed in digital form to the circuit 500 of the phase slope shaper 404.

In one embodiment, the circuit 500 comprises a digital-to-analog (D2A) converter, an operational amplifier (OPAMP) 502, and replica bias transistors MP1, MN1, and MN2 coupled together as shown in FIG. 5. In one embodiment, the D2A 501 converts the digital form of the bias voltages routed from clock generation module 402 into analog form V1. The analog voltage V1 is then replicated via the OPAMP 502 to generate pbias and nbias bias voltages. In one embodiment, the pbias and nbias bias voltages are used by the phase slope shaper 404 to adjust the slope of the control signals with respect to their frequency, the control signals used for controlling turning on/off of the switches in the switch matrix array 405.

FIG. 6 is a phase slope shaper stage 600 of the phase slope shaper 404 of the SVR $401_1$/102, according to one embodiment of the disclosure. In one embodiment, the phase slope shaper 404 comprises a plurality of phase slope shaper stages coupled together to adjust slope of the phase signals generated by the digital phase generator 403.

In one embodiment, the phase slope shaper stage 600 converts a digital input slope (of signals In and In_b) to a shaped output slope (of signals O_b and O) which is substantially equal to T_slope of Tvco/2. In one embodiment, the plurality of phase slope shaper stages coupled together such that In and In_b of one stage is coupled to O and O_b of the next stage. In one embodiment, the output slope (of signals O and O_b) is determined by the stage current and output load. In one embodiment, the stage current is determined by trim-able MN1 and MP1 current sources. The term "trim-able" herein refers to the ability to adjust device size (width and length W/L) by adding or subtracting devices from MN1 and MP1 current sources. Devices are added by turning them on while devices are subtracted by turning the devices off.

In one embodiment, trimming is applied to compensate the stage current with respect to variations in process, temperature, and voltage (PVT). In one embodiment, the compensation of the stage current is performed by digital signals VCOcs_b[2:0] and VCOcs[2:0].

In one embodiment, the same digital signals VCOcs_b[2:0] and VCOcs[2:0] are coupled to all the plurality of slope shaper stages of the phase slope shaper 404 to set the stage current for each slope shaper stage. In one embodiment, changes in the SVR switching frequency corresponds to changes in VCO frequency of the clock generation unit 402 by tracking the VCO bias voltages of the clock generation unit 402.

Figure 7:
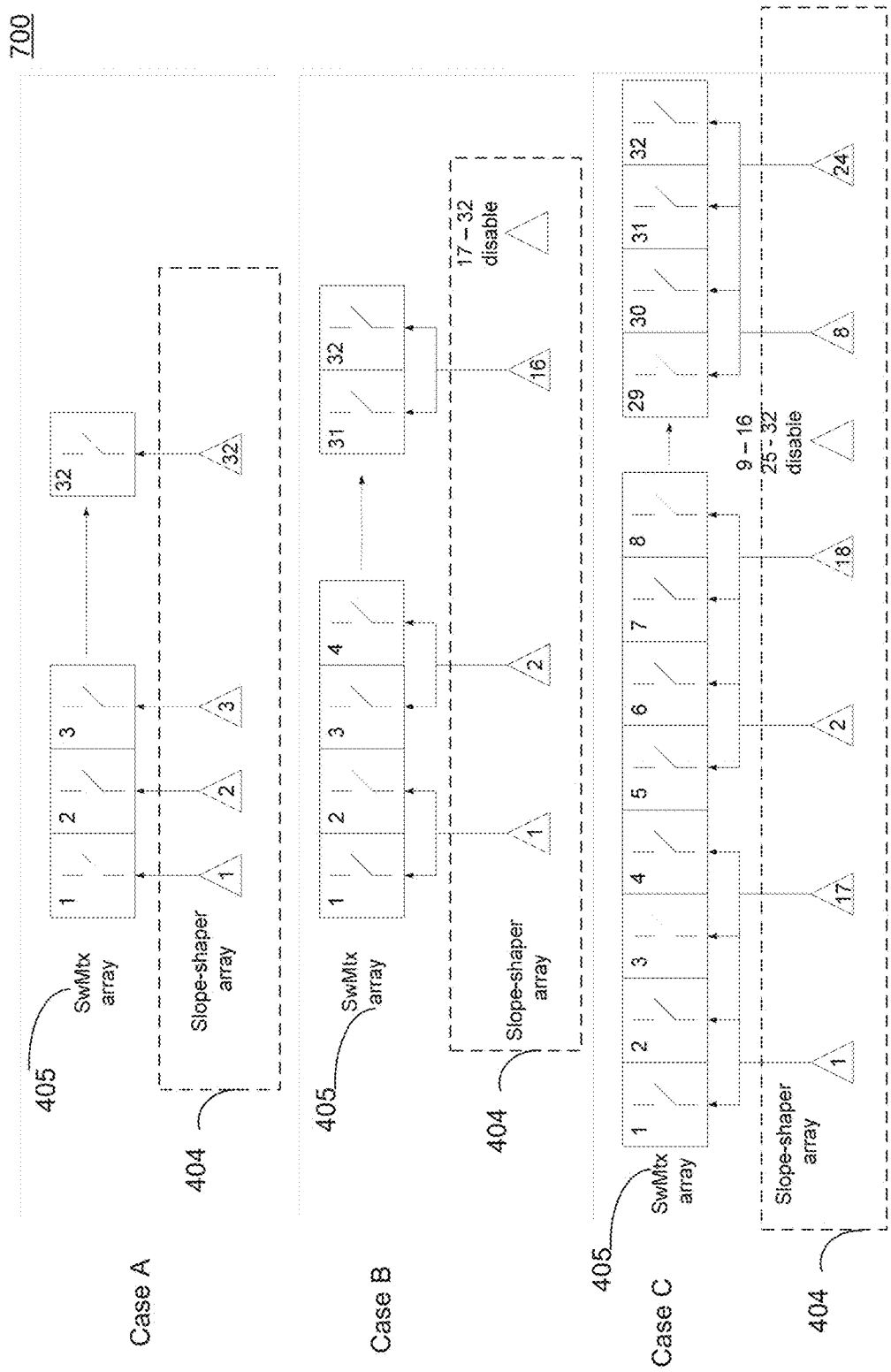
FIG. 7 is a control signal selector for controlling a switch matrix of the SVR for various switching frequencies, according to one embodiment of the disclosure.

FIG. 7 is a control signal selector 700 for controlling the switch matrix array 405 of the SVR 102 for various switching frequencies, according to one embodiment of the disclosure. In one embodiment, the phase slope shaper 404 drives the switch matrix array 405 via a phase selector which is functionally illustrated in FIG. 7.

In one embodiment, the phase-selector comprises a multiplexer that sets the connection between the slope shaper stages of the phase slope shaper 404 to the switch-matrix array 405 by means of a selected frequency division mode (e.g., 8×, 16×, 32×, etc.). FIG. 7 illustrates three division mode cases—Case A, Case B, and Case C.

Case A represents a switching frequency scenario when divide-by-32 option is selected for the digital phase generator 403. In this embodiment, the phase-selector selects phases from the phase slope shaper 404 such that the 32 switch matrix elements of the switch matrix array 405 receive direct output from corresponding slope shaper stages. Case B represents a switching frequency scenario when divide-by-16 option is selected for the digital phase generator 403. In this embodiment, the phase-selector selects phases from the phase slope shaper 404 such that every two switch matrix elements of the 32 switch matrix elements of the switch matrix array 405 receive phase signal from corresponding slope shaper stages. Case C represents a switching frequency scenario when divide-by-8 option is selected for the digital phase generator 403. In this embodiment, the phase-selector selects phases from the phase slope shaper 404 such that every four switch matrix elements of the 32 switch matrix elements of the switch matrix array 405 receive phase signal from corresponding slope shaper stages. In one embodiment, the multiplexer is controlled by a decoder. In one embodiment, the slope shaper stages that are not needed in a certain modes (e.g., 8×, 16×, 32×, etc.) are disabled for power saving.

Figure 8:
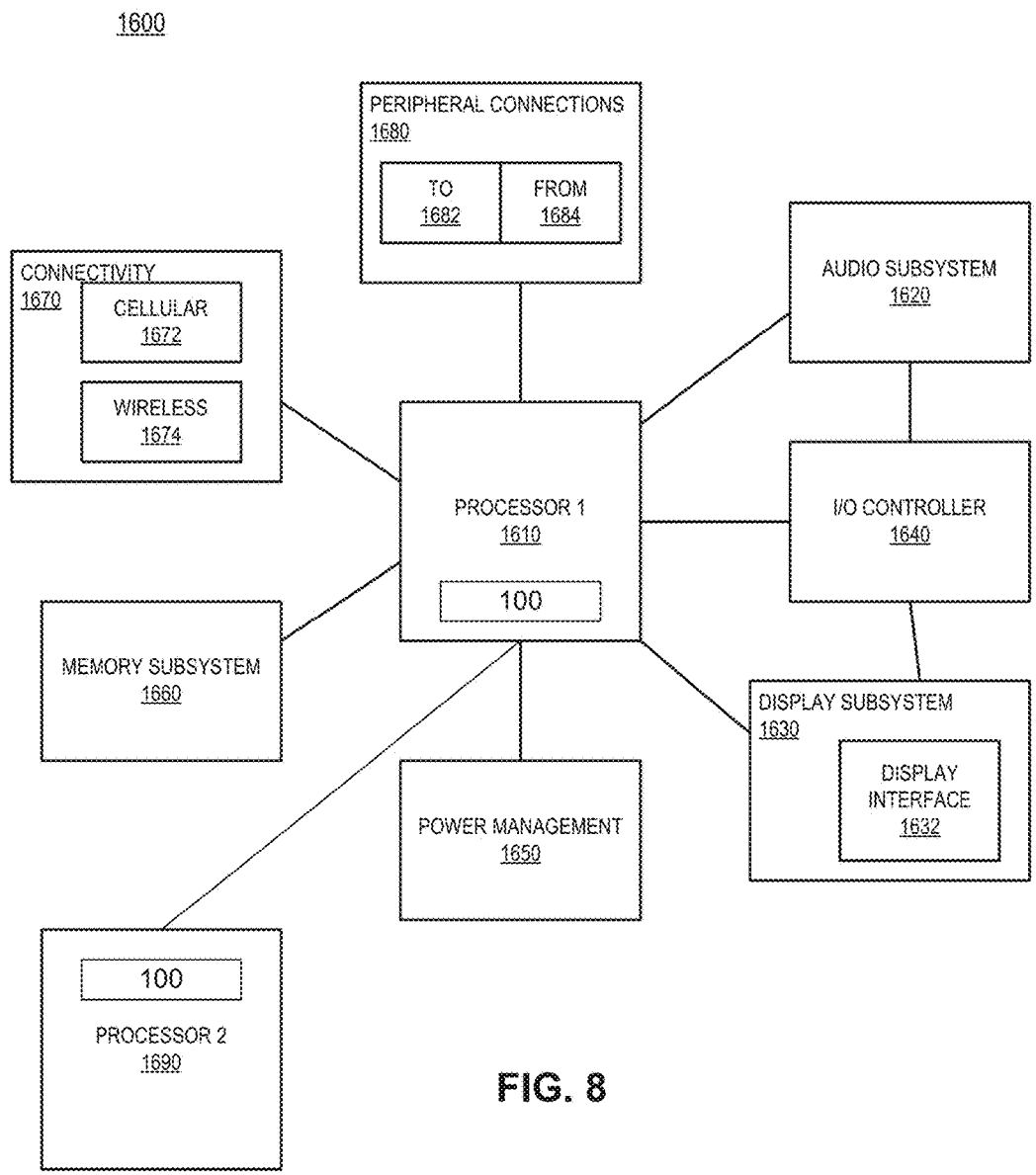
FIG. 8 is a system-level diagram of a smart device comprising a processor with the SVR, according to one embodiment of the disclosure.

FIG. 8 is a system-level diagram of a smart device comprising a processor with the SVR 102, according to one embodiment of the disclosure. FIG. 8 also illustrates a block diagram of an embodiment of a mobile device in which flat surface interface connectors could be used. In one embodiment, the computing device 1600 represents a mobile computing device, such as a computing tablet, a mobile phone or smart-phone, a wireless-enabled e-reader, or other wireless mobile device. It will be understood that certain of the components are shown generally, and not all components of such a device are shown in device 1600.

In one embodiment, the computing device 1600 includes a first processor 1610 with the SVR 102 and a second processor 1690 with the SVR 102, according to the embodiments discussed herein. The various embodiments of the present disclosure may also comprise a network interface within 1670 such as a wireless interface so that a system embodiment may be incorporated into a wireless device, for example, cell phone or personal digital assistant.

In one embodiment, the processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, the computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to device 1600 through which a user might interact with the system. For example, devices that can be attached to the computing device 1600 might include microphone devices, speaker or stereo systems, video systems or other display device, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem includes a touch screen, the display device also acts as an input device, which can be at least partially managed by I/O controller 1640. There can also be additional buttons or switches on the computing device 1600 to provide I/O functions managed by I/O controller 1640.

In one embodiment, the I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, the computing device 1600 includes power management 1650 that manages battery power usage, charging of the battery, and features related to power saving operation. Memory subsystem 1660 includes memory devices for storing information in device 1600. Memory can include nonvolatile (state does not change if power to the memory device is interrupted) and/or volatile (state is indeterminate if power to the memory device is interrupted) memory devices. Memory 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 1674 refers to wireless connectivity that is not cellular, and can include personal area networks (such as Bluetooth, Near Field, etc), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on device 1600. Additionally, a docking connector can allow device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented i.e., such specifics should be well within purview of one skilled in the art. Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment an integrated circuit comprises: a switching voltage regulator (SVR), having one or more bridge drivers, to provide regulated power supply to a plurality of power domains; and a power control unit (PCU) operable to adjust switching frequencies of the SVR according to states of the plurality of power domains, wherein drive strength or active phase count of the one or more bridge drivers is also adjusted by a logic unit of the SVR when the switching frequencies of the SVR are adjusted.

In one embodiment, the integrated circuit further comprises a memory unit to store switching frequencies for the plurality of power domains. In one embodiment, the PCU is operable to access the memory unit when a state of any one of the states of the plurality of power domains changes. In one embodiment, the memory unit is part of the PCU. In one embodiment, the memory unit is accessible by software or hardware to adjust values of the switching frequencies for the plurality of power domains.

In one embodiment, the power domains are associated with different parts of the integrated circuit including at least one of: one or more processing cores, one or more cache units, one or more input-output (I/O) drivers, and one or more graphics units. In one embodiment, the voltage regulator is a DC-DC buck type multiphase converter. In one embodiment, the states include P-states and C-states associated with the plurality of power domains.

In one embodiment, the integrated circuit further comprises a memory unit to store switching frequencies associated with P-states and switching frequencies associated with C-states. In one embodiment, the PCU is operable to adjust the switching frequencies to cause the SVR to operate with substantially minimum SVR losses. In one embodiment, the PCU is operable to adjust switching frequencies of the SVR by dynamically selecting an output signal having multiple phases from a divider of the SVR. In one embodiment, the SVR comprises a phase slope shaper operable to receive the output signal selected from the divider, the phase slope shaper to generate a signal corresponding to the output signal but with adjusted slope.

In one embodiment, the phase slope shaper is operable to reduce slope of the signal when frequency of the output signal increases, and wherein the phase slope shaper circuit is operable to decrease slope of the signal when frequency of the output signal increases. In one embodiment, the phase slope shaper is coupled to a switch matrix via a phase selection stage. In one embodiment, the switch matrix is operable to generate a triangular wave signal according to the signal received from the phase slope shaper. In one embodiment, the integrated circuit further comprises multiplexers coupled to the phase slope shaper and the switch matrix. In one embodiment, the one or more bridge drivers of the SVR have adjustable drive strengths which are adjusted when any state of the plurality of power domains changes. In one embodiment, the logic unit is operable to adjust drive strengths of the one or more bridge drivers to cause the SVR to operate with substantially minimum SVR losses.

In another example, a computer system comprises: a memory; a processor coupled to the memory, the processor including: a switching voltage regulator (SVR), having one or more bridge drivers, to provide regulated power supply to a plurality of power domains; and a power control unit (PCU) operable to adjust switching frequencies of the SVR according to states of the plurality of power domains, wherein drive strength or active phase count of the one or more bridge drivers is also adjusted by a logic unit of the SVR when the switching frequencies of the SVR is adjusted; and a wireless interface for communicatively coupling the processor with other devices.

In one embodiment, the processor includes a plurality of processing cores, each processing core associated with a power domain from the plurality of power domains. In one embodiment the computer system further comprises a display unit communicatively coupled to the processor. In one embodiment, the processor is according to the integrated circuit discussed above.

In another example, a voltage regulator integrated in a processor comprises: a switch matrix operable to generate a pulse width modulated signal; and a phase slope shaper to generate a first signal, having multiple phases, for controlling switches of the switch matrix, the phase slope shaper operable to adjust slope of the first signal according to a frequency of a periodic signal. In one embodiment, the phase slope shaper is operable to receive bias signals corresponding to bias signals of a phase-locked-loop (PLL). In one embodiment, the bias signals are substantially the same (voltage and/or current levels) to the bias signals used for operating a voltage controlled oscillator (VCO) of the PLL. In one embodiment, the PLL is a SBPLL. In other embodiments, other PLL architectures may be used. For example, LC Oscillator based PLL, digital PLL, etc.

In one embodiment, the voltage regulator further comprises a divider coupled directly or indirectly to the phase slope shaper. In one embodiment, the divider is operable to provide a selection of signals with different phases. In one embodiment the voltage regulator further comprises one or more bridge drivers with adjustable drive strength, the one or more bridge drivers to provide regulated power supply to a plurality of power domains. In one embodiment, the voltage regulator wherein a power control unit (PCU) is operable to adjust switching frequencies of the first signal according to states of the plurality of power domains, wherein drive strength or active phase count of the one or more bridge drivers is also adjusted when the switching frequencies are adjusted.

In one embodiment, the switching frequencies for the plurality of power domains are stored in a memory unit. In one embodiment, the PCU is operable to access the memory unit when a state of any one of the states of the plurality of power domains changes. In one embodiment, the memory unit is part of the PCU. In one embodiment, the memory unit is accessible by software or hardware to adjust values of the switching frequencies for the plurality of power domains. In one embodiment, the power domains are associated with different parts of the processor including at least one of: one or more processing cores, one or more cache units, one or more input-output (I/O) drivers, and one or more graphics units.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An integrated circuit comprising:
   a switching voltage regulator (SVR) comprising one or more bridge drivers to provide regulated power supply to a plurality of power domains that comprise a first power domain and a second power domain, wherein the SVR is operable to provide a plurality of switching frequencies including a first switching frequency and a second switching frequency; and
   a power control unit (PCU) operable to adjust the switching frequencies of the SVR according to states of the plurality of power domains, wherein at least one of a drive strength and an active phase count of the one or more bridge drivers is adjusted by a logic unit of the SVR when at least one of the switching frequencies of the SVR is adjusted, wherein the first power domain is optimized using the first switching frequency and the second power domain is optimized using the second switching frequency.

2. The integrated circuit of claim 1 further comprises a memory unit to store the plurality of switching frequencies for the plurality of power domains.

3. The integrated circuit of claim 1, wherein the PCU is operable to access the memory unit when a state of any one of the states of the plurality of power domains changes.

4. The integrated circuit of claim 1, wherein the memory unit is part of the PCU.

5. The integrated circuit of claim 1, wherein the memory unit is accessible by software or hardware to adjust values of the switching frequencies for the plurality of power domains.

6. The integrated circuit of claim 1, wherein the power domains are associated with different parts of the integrated circuit including at least one of:
   one or more processing cores,
   one or more cache units,
   one or more input-output (I/O) drivers, or
   one or more graphics units.

7. The integrated circuit of claim 1, wherein the voltage regulator is a DC-DC buck type multiphase converter.

8. The integrated circuit of claim 1, wherein the states include P-states and C-states associated with the plurality of power domains.

9. The integrated circuit of claim 1 further comprises a memory unit to store the plurality of switching frequencies associated with P-states and switching frequencies associated with C-states.

10. The integrated circuit of claim 1, wherein the PCU is operable to adjust the switching frequencies to cause the SVR to operate with substantially minimum SVR losses.

11. The integrated circuit of claim 1, wherein the PCU is operable to adjust switching frequencies of the SVR by dynamically selecting an output signal having multiple phases from a divider of the SVR.

12. The integrated circuit of claim 1, wherein the one or more bridge drivers comprise one or more transistors that act as switches of the SVR.

13. The integrated circuit of claim 1, wherein the one or more bridge drivers of the SVR have adjustable drive strengths which are adjusted when any state of the plurality of power domains changes.

14. The integrated circuit of claim 1, wherein the logic unit to adjust drive strengths of the one or more bridge drivers to cause the SVR to operate with substantially minimum SVR losses.

15. A computer system comprising:
   a memory;
   a processor coupled to the memory, the processor comprising
      a switching voltage regulator (SVR)-comprising one or more bridge drivers to provide regulated power supply to a plurality of power domains that comprise a first power domain and a second power domain, wherein the SVR is operable to provide a plurality of switching frequencies including a first switching frequency and a second switching frequency; and
      a power control unit (PCU) operable to adjust the switching frequencies of the SVR according to states of the plurality of power domains, wherein at least one of a drive strength and an active phase count of the one or more bridge drivers is adjusted by a logic unit of the SVR when at least one of the switching frequencies of the SVR is adjusted, wherein the first power domain is optimized using the first switching frequency and the second power domain is optimized using the second switching frequency; and
   a wireless interface for communicatively coupling the processor with other devices.

16. The computer system of claim 15, wherein the processor includes a plurality of processing cores, each processing core associated with a power domain from the plurality of power domains.

17. The computer system of claim 15, further comprises a display unit communicatively coupled to the processor.

18. The computer system of claim 15, wherein the memory is to store the plurality of switching frequencies for the plurality of power domains.

19. The computer system of claim 15, wherein the power domains are associated with different parts of the integrated circuit including at least one of:
    one or more processing cores,
    one or more cache units,
    one or more input-output (I/O) drivers, or
    one or more graphics units.

20. The computer system of claim 15, wherein the one or more bridge drivers comprise one or more transistors that act as switches of the SVR.

* * * * *